April 28, 1970     D. G. STEPHENS ET AL     3,508,578

FLEXIBLE RING SLOSH DAMPING BAFFLE

Original Filed Feb. 25, 1966     2 Sheets-Sheet 1

INVENTORS
DAVID G. STEPHENS
GEORGE W. BROOKS

BY

ATTORNEYS

INVENTORS
DAVID G. STEPHENS
GEORGE W. BROOKS

BY
ATTORNEYS

United States Patent Office 3,508,578
Patented Apr. 28, 1970

3,508,578
FLEXIBLE RING SLOSH DAMPING BAFFLE
David G. Stephens, Box 246, Yorktown, Va. 23490, and George W. Brooks, 9 Sylvia Drive, Tabb, Va. 23602
Continuation of application Ser. No. 532,526, Feb. 25, 1966. This application June 3, 1968, Ser. No. 739,927
Int. Cl. E03b 11/00
U.S. Cl. 137—582
15 Claims

ABSTRACT OF THE DISCLOSURE

A device for reducing sloshing of liquid in spacecraft fuel tanks. Carrying and positioning structure is located in the fuel tank and designed to be effective at all levels of liquid in the tank. A baffle or similar structure is associated with the carrying and positioning structure. The baffle can move relative to the carrying and positioning structure under the influence of moving liquid. This increases mixing action of the fluid resulting in decreased sloshing.

This is a continuation of application Ser. No. 532,526, filed Feb. 25, 1966, now abandoned.

The invention described herein was made by employees of the United States Government and may be manufactured and used by or for the Government for governmental purposes without the payment of any royalties thereon or therefor.

This invention relates to a means for damping the movement of liquid in a container, and more particularly to a damping arrangement utilizing baffles wherein the baffles move under the influence of the liquid to increase mixing thereof and thereby damp the movement of the liquid.

The problem of liquid motion in a container which is subjected to forces has been a major problem in the past and continues to be a problem. This is particularly true of liquid propellants stored in launch vehicles, missiles and other tankage systems.

Since the advent of the space age, the primary technique utilized to damp sloshing of liquid has been baffles. To date, these baffles have usually consisted of rigid, washer-like shaped members which are fixed to the interior wall of the tank at spaced intervals from end to end. Although this type of baffle has operated to a degree sufficient to allow use of the tankage in the intended environment, its operation has been far from satisfactory in accomplishing the desired result. Not only does the rigid type baffle fail to operate to provide optimum realizable damping per unit of baffle area, but this type of baffle is extremely heavy, thus penalizing the entire system placing a severe weight penalty on payload capability. For example, the ring baffles employed in the Saturn V, which represent the current state of the art, weigh approximately 4.5 tons representing about 20 percent of the tank weight.

Other mechanisms have been considered for damping and controlling the movement of liquid in the container. One of these techniques is that of capping the liquid surface. As with the previous technique, this technique requires a device of considerable weight in addition to a complex control system for positioning the cap as the tank drains. Thus, the inherent problem of malfunction, always present with a complex system, indicates that such an arrangement is not particularly attractive as a slosh control. Furthermore, this type of arrangement is prone to interfere with internal hardware such as feedlines positioned in the tank structure.

Certain floating systems have also been considered. Prior art arrangements, however, have featured floating systems which are capable of large degrees of movement allowing the devices to become missiles in and of themselves. Thus, when the tankage is subjected to severe directional changes, the floating systems are able to impact the tankage structure with considerable force causing damage to the tank walls.

The present invention provides an arrangement and modifications thereof which overcome many of the above discussed problems. This is accomplished by baffle arrangements which are capable of moving, deforming or deflecting under the influence of the moving liquid, however, the baffles are also restricted in some manner to oppose the oscillatory movement of sloshing of the liquid. It has been found that this arrangement actually increases the mixing of the liquid by the baffle when compared with the baffle arrangements discussed above. This increased mixing opposes the sloshing tendency of the liquid thereby increasing the damping action. With increased damping action, it is believed clear that it would take less baffle area and consequently less baffle weight to accomplish equivalent or greater damping.

It is therefore an object of this invention to provide a baffle arrangement for damping the motion of liquid in a container wherein the baffle is under limited restraint but capable of moving, deforming, or deflecting under the influence of the liquid.

Another object of this invention is to provide a baffle arrangement for damping liquid oscillations in a container wherein the baffle means for damping is able to change its position with a changing level of liquid.

An additional object of the invention is to provide an arrangement for damping the motion of liquid in a container wherein part of the baffle apparatus provides stiffening for the container structure.

An added object of the invention is to provide an arrangement for damping the movement of liquid in a container wherein baffle means are elastically connected to the container allowing elastically restrained movement of the baffles with the motion of the liquid.

Yet another object of this invention is to provide a device for damping the motion of liquid in a container having baffle means which are of a flexible nature being capable of limited movement with the liquid, but being restrained against free movement with the liquid.

A further object of the invention is to provide an arrangement for damping the motion of liquid in a container which is of simple construction, easy to manufacture and maintain, and is of light weight and small size.

These and other objects and advantages of the invention will become more apparent upon reading the specification when taken in conjunction with the accompanying drawings.

Basically, this invention is directed to apparatus for damping the movement of a liquid in a container. The container may be of the nature of a launch vehicle propellant storage tank. A baffle arrangement is located within the container which is allowed to move with the motion of liquid in the container, but is designed to oppose movement of the liquid thereby increasing the mixing between the baffle and the liquid to effectively damp motion of the liquid. The structure of the baffle which opposes the motion of the fluid may take various forms such as a floating cage, buoyant baffles which are restricted between stops, baffles constructed of a flexible material, a rigid type of baffle which is elastically connected to the container.

Figure 1:
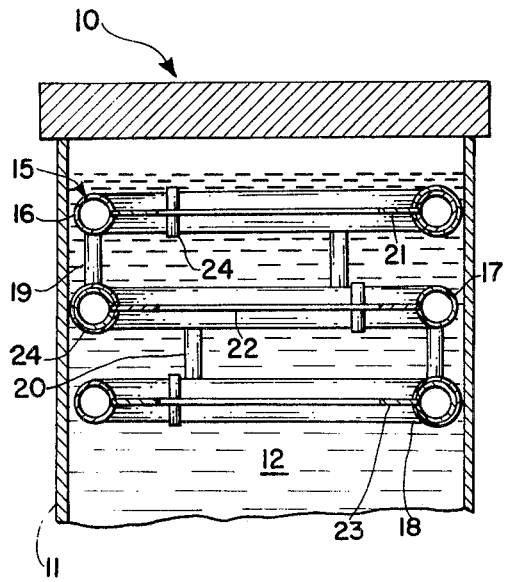
FIG. 1 is a cross-sectional view of a container section showing a baffle arangement and its operational position.

Referring now more specifically to the details of the invention, FIG. 1 shows a cross-sectional view of a liquid damping system which is designated generally by the reference numeral 10.

The system 10 includes a container or storage tank 11 which may be tankage of a launch vehicle or some other system. The particular configuration of the tank is not important, since the invention can be adapted to function with most any configuration. However, for purposes of illustration, the tank 11 is shown to be cylindrical in nature. The ends of the tank may take various shapes and forms, and may be designed according to the best pressure vessel techniques since many of the propellants utilized in launch vehicles are stored under pressure. The tank 11 is initially nearly filled with liquid 12 to enable maximum utilization of the tank.

The baffle arrangement shown associated with the container 11 is termed a damper cage and designated generally by the reference numeral 15. The damper cage 15 shown in FIGS. 1 and 2 includes an upper support tube 16, an intermediate support tube 17 and a lower support tube 18. These support tubes are connected together by struts, upper connecting struts 19 joining the upper and intermediate tubes and lower support struts 20 joining the lower and intermediate tubes. These struts are positioned at equally spaced intervals about the circumference of the tubes, three connecting struts being shown for connecting the upper to the intermediate tube and three for connecting the lower to the intermediate tube. Obviously, more or less of the struts may be utilized depending on the design criteria and structural integrity necessary for the damper cage in the particular environment. Although one intermediate tubular member 17 is shown, it is to be understood that within the broadest aspect of the invention several intermediate tubes may be utilized depending on the design necessary to accomplish optimum damping. The cage is of a tubular design so that it will be of a buoyant nature and follow the level of the liquid as the tank empties. Obviously, other techniques for rendering the cage buoyant might be utilized, such as the addition of flotation material, etc.

Figure 2:
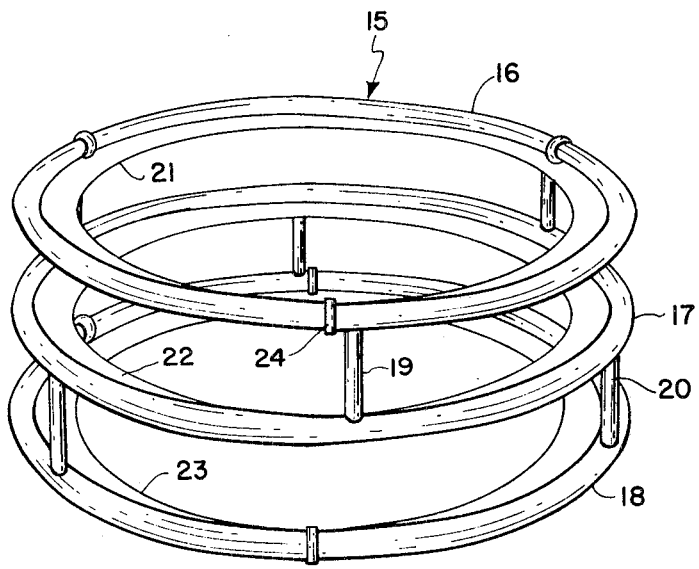
FIG. 2 is a perspective view of the baffle cage arrangement shown in FIG. 1.

Fixed to the damper cage 15, and specifically to upper, intermediate and lower tubes respectively, are upper flexible baffle 21, intermediate flexible baffle 22, and lower flexible baffle 23. The baffles may be fixed to the tubes by cutting a slot in the tubes, inserting the baffles in the slots and pinching the tube on the slots. Obviously, many techniques may be used for connecting the baffles to the tubes. As best seen in FIG. 2, these baffles are of a washer-like configuration, of a continuous nature, and project inwardly from the tubular members. The width or degree to which the baffles extend into the container as well as the degree of flexibility are dependent upon the design criteria necessary for damping the liquid in a particular container. Since the baffles move with the motion of the liquid, they are quite thin and accomplish their purpose. The baffles may be constructed of most any type of flexible material which will hold up under the liquid movement and pressures with which it is to be associated. It should also be understood that under certain circumstances it may be desirable to have rigid baffles elastically connected (such as by spring) or merely rigid baffles connected to the cage structure.

As shown in FIG. 1, the cage is designed to be of a dimension such that it lies adjacent the walls of the container. The purpose of this is to provide a structure which will not damage the walls of the container should the launch vehicle be subjected to violent directional changes. Due to the length or height of the cage (depending on how viewed), it will tend to wedge between the walls of the container thus preventing movement of the cage per se with oscillation of the liquid. To further prevent damage to the container walls by the cage, a series of buffers 24 are attached to the support tubes at spaced intervals thereabout. These buffers may be constructed of a material such as Teflon which is self-lubricating and also has a certain amount of resiliency to operate as a buffer. Obviously, the buffer 24 may take various shapes and designs to accomplish the desired purpose, for example, the buffer may be a washer-like member about the entire periphery of the support tubes, positioned opposite the baffles 21 through 23.

Figure 3:
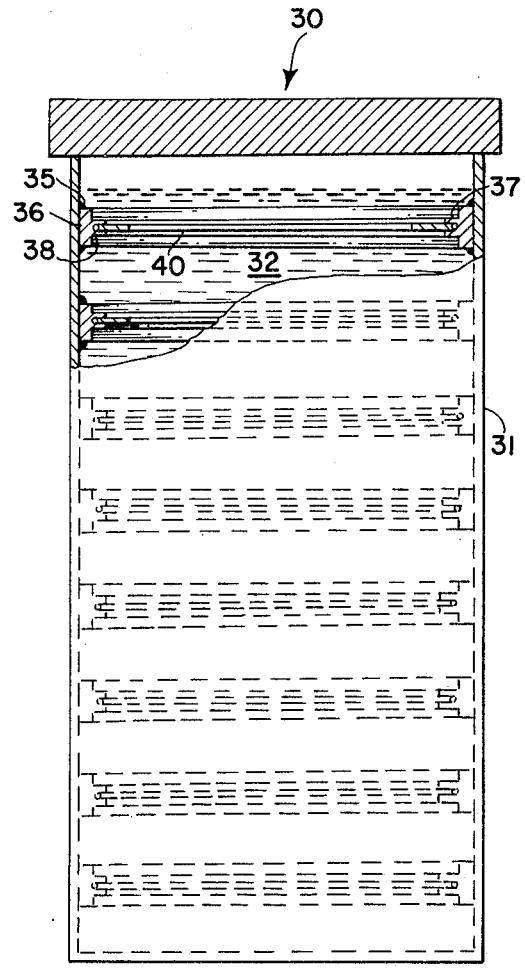
FIG. 3 is a cross-sectional view of a container showing a modified form of the invention utilizing flexible baffles.

A modified form of liquid damper system is shown in FIG. 3 and designated generally by the reference numeral 30. The tank 31 is of a nature similar to the tank 11 and would contain liquid 32 in a similar manner.

The baffle arrangement, however, differs from that of the damper system 10. Ring stiffeners 35 are secured to the interior walls of the tank 31 at spaced intervals from one end of the tank to the other. The stiffeners 35 are fixed to the tank in a conventional manner such as by welding. They are of a generally T-shaped configuration in cross-section having a base portion 36 which is fixed to the container wall and a leg portion 37 which projects inwardly toward the center of the container. The stiffener legs 37 have slots 38 which are adapted to receive the flexible baffle 40. The baffle 40 is similar in design to the baffle 21 in the damper system 10. The edge of the baffle 40 is inserted in the slot 38 and clamped in position or fixed thereto in some other conventional manner.

Figure 4:
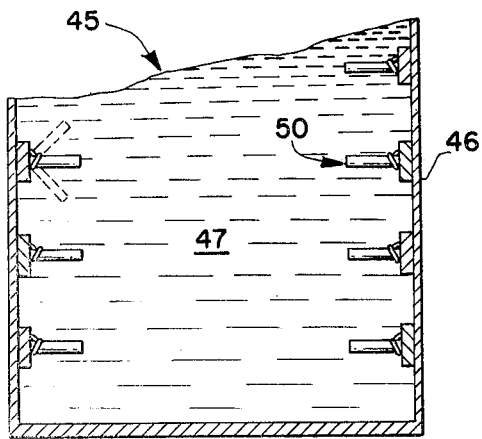
FIG. 4 is a cross-sectional view of another modified form of the invention baffle arrangement showing baffles elastically connected to the container.
Figure 5:
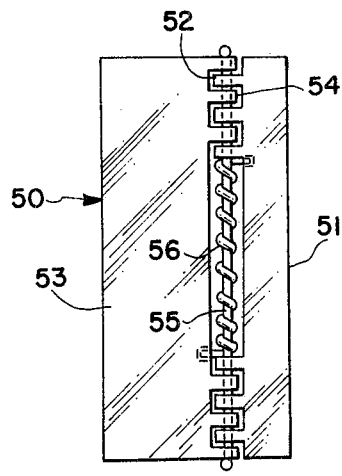
FIG. 5 is a plan view of one of the baffles shown in FIG. 4.

FIGS. 4 and 5 show yet another form of the liquid damping system designated generally by the reference numeral 45. This system also illustrates a tank 46 and liquid 47 disposed therein. Rather than utilizing flexible baffles as shown in the systems 10 and 30, the system 45 utilizes baffle apparatus 50 including rigid baffles elastically connected to the walls of the container. This is accomplished by securing a number of base plates 51 to the interior wall of the container. The base plates have hinge projections 52 which extend inwardly into the container. The baffle 53 is a plate-like member having hinge fingers 54 which are interlaced with the hinge projections 52. A hinge pin 55 is inserted through apertures formed in the hinge projections and hinge fingers providing an arrangement whereby the baffle is hinged to the base plate. A spring 56 surrounds the hinge pin 55 and has one end thereof anchored in or to the base plate 31 and the other end in or to the baffle 53. The container 46 as shown in FIG. 4 is of a rectangular or square configuration, the baffles being shown connected to the sidewalls of the container. It is to be understood, however, that within the broadest aspect of the invention the baffles may be secured to a circular or other shape of container, merely by shaping the baffles and base plate to conform to the desired configuration and that the baffles may be mounted on all walls of the container. Also, it should be understood that it is considered within the purview of the invention to utilize springs other than a torsion type for elastic connection of the baffle to the base plate.

Figure 6:
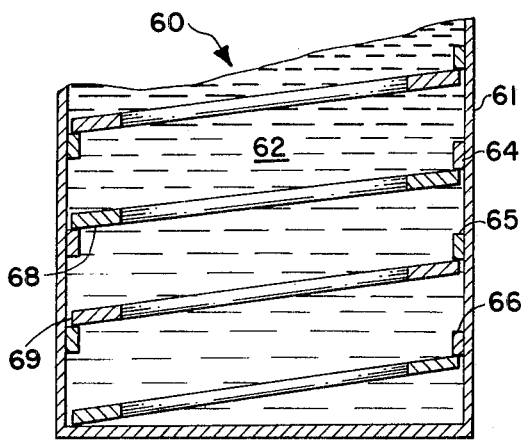
FIG. 6 is a cross-sectional view of a baffle arrangement which is allowed limited movement between stops on the container to provide damping.

Another modification of a liquid damping system is shown in FIG. 6 and designated generally by the reference numeral 60. The system 60 includes a tank or container 61 having liquid 62 disposed therein. As in the previous embodiments, the tank may take any configuration necessary for fulfilling the particular design requirements. The interior wall of the tank has fixed thereto in a conventional manner, such as by welding, a series of stops. Certain of these stops have been designated by the reference numerals 64, 65, and 66. The stops may take various configurations and may be in the form of continuous rings about the interior of the container. The stops may also function as structural reinforcement for the container.

Located between the stops are baffles, two of which are designated 68 and 69 for purposes of illustration. These baffles are of a washer-like configuration and are located between adjacent stops. The baffles are dimensioned such that they are free to move within the container without particularly interfering with the walls of the container, but are large enough so as to be confined in their movement between the stops. These baffles are made from a rigid or semi-rigid material to prevent their buckling or escaping from the stops.

OPERATION

From the above description of the invention, the operation is believed understandable. In the damping system 10, the damper cage 15 floats adjacent the surface of the liquid. This is possible due to its buoyant construction. When the liquid 12 is subjected to a force which causes the liquid to move, the movement of the liquid will act upon the baffles 21 through 23. It has been found through experimentation that the resulting baffle displacement motion is not in unison with the liquid motion. The baffle motion is in fact of such a nature as to increase the mixing of the liquid, the mixing motion creating a high degree of liquid damping. The greatest sloshing motion takes place in or near the surface of the liquid, the buoyant cage arrangement thus being located at the point where it is most effective. Due to the buoyant nature of the cage, it will follow the level of the liquid providing damping of the liquid regardless of its level in the container.

Generally, the baffles 40 of the damping system 30 operate in a manner similar to the baffles 21 except that they are not floating. Rather, it is apparent that the baffles are positioned from one end of the container to the other providing a means for damping regardless of the liquid level. The principle whereby the baffle lags the initial motion of the liquid and thus opposes the return motion, capable of the flexible member, is the same as in the previous embodiment.

The baffles 53 utilized with the damping system 45 also operate in generally the same manner as the other baffles. The torsion spring 56 tends to bias the flap in a neutral position parallel to the undisturbed surface of the fluid. The motion of the liquid is thus opposed by a counter motion of the elastically restrained baffle. The dotted line position of the baffle shown in FIG. 4 is illustrative of the limits of baffle movement.

The damping systems 60 of FIG. 6 also operates on the principle of the baffle lagging the motion of the liquid. In the damping system 60, however, the baffles are allowed to move freely with the fluid in one direction under the initial motion of the liquid and will tend to continue to move in this direction, during the initial return of motion of the liquid, thus opposing its motion and causing a mixing action to damp the movement of the liquid.

From the above description, it is believed apparent that the baffle arrangements disclosed provide means which greatly reduce the weight of baffles in liquid storage containers. With the rigid baffle arrangement, the baffles must be of sufficient structural integrity to prevent breaking under the impinging action of the fluid, requiring a substantial structure. With the invention baffle which can move with the motion of the liquid, breakage of the baffle is no problem since it is intentionally designed to be flexible and will yield under the influence of the liquid. Thus, it is apparent that the baffle can be made a fraction, as much as ten times less in weight than the rigid baffle. The type of baffle that moves with the liquid not only greatly reduces the weight of the baffle required, but increases the mixing action of the fluid thereby enhancing damping over the rigid baffle arrangement. Certain embodiments of the invention are also designed so as to follow the level of the liquid providing damping at and near the surface where experimental and theoretical results have shown that the baffle accomplishes the greatest damping result for minimum weight. Furthermore, certain of the damping arrangements provide reinforcement for the tankage thus performing the double function of damping and structural integrity for the liquid container.

What is claimed as new and desired to be secured by Letters Patent of the United States is:

1. Apparatus for damping the movements of a liquid in a container or the like comprising:
    a container capable of retaining liquid subjected to directional changes;
    carrying and positioning means located within the container; and
    means associated with said carrying and positioning means directly connected thereto located at spaced points therealong in the depth direction of said liquid moving relative to the carrying and positioning means under the influence of liquid to oppose sloshing movement of the liquid.

2. Apparatus for damping the movements of a liquid in a container of the like comprising:
    a container capable of retaining liquid subjected to directional changes;
    buoyant cage means capable of changing its position with a change of liquid level in the container; and
    baffle means substantially encompassing said buoyant cage means movable relative thereto and being carried and positioned by said cage means to oppose sloshing movement of the liquid at all levels thereof.

3. Apparatus for damping the movement of a liquid in a container or the like comprising:
    a container capable of retaining liquid subjected to directional changes;
    means for carrying and positioning baffle means located within the container; and
    baffle means directly connected to said carrying and positioning means located at spaced points therealong in the depth direction of the liquid and movable relative to said carrying and positioning means under the influence of liquid to oppose sloshing movement of the liquid at various levels thereof.

4. Apparatus for damping the movement of a liquid in a container or the like as in claim 3 wherein said means for positioning said baffle means is a buoyant cage; and
    said baffle means being flexible and movable relative to said buoyant cage means.

5. Apparatus for damping the movement of a liquid in a container or the like as in claim 3 wherein said means moving under the influence of liquid are deflecting baffles; and
    a buoyant cage for carrying said baffles.

6. Apparatus for damping the movement of a liquid in a container or the like as in claim 3 wherein said means capable of moving under the influence of liquid is a buoyant cage;
    said cage having an upper tubular member, and a lower tubular member;
    connector struts for joining and spacing said tubular members; and
    flexible baffle members movable relative to and carried by said tubular members.

7. Apparatus for damping the movement of a liquid in a container or the like as in claim 3 wherein said means for positioning said baffle means is a buoyant cage; said cage having a continuous upper member shaped generally to a cross section of the container and being designed to lie adjacent the container interior; at least one intermediate member designed like said first mentioned member; and a lower member designed like said first and intermediate members; connector struts for joining and spacing said members; and said baffle means being flexible baffle structure secured to said upper, intermediate, and lower members; said baffles projecting inwardly and generally in a direction to oppose the sloshing movement of the liquid.

8. Apparatus for damping the movement of a liquid in a container or the like as in claim 7 wherein said buoyant cage has buffer means fixed to said upper, intermediate and lower members for engaging the walls of the container to prevent the cage from damaging the container during liquid movement.

9. Apparatus for damping the movement of a liquid in a container or the like as in claim 3 wherein said container has an interior wall; stiffener members fixed to said container interior wall at spaced intervals; and said means capable of moving under the influence of liquid being flexible baffles carried by said stiffener members.

10. Apparatus for damping the movement of a liquid in a container or the like as in claim 3 wherein said container has an interior wall; continuous generally T-shaped stiffener members fixed to said container interior wall at spaced intervals from end-to-end of said container; and said baffle means capable of moving under the influence of liquid being flexible baffles; said baffles being generally flat, washer-like members and being held by a leg of said T-shaped stiffeners.

11. Apparatus for damping the movement of a liquid in a container or the like as in claim 3 wherein said means capable of moving under the influence of liquid is a series of baffles; and means for elastically connecting said baffles to said container.

12. Apparatus for damping the movement of a liquid in a container or the like as in claim 3 wherein said means capable of moving under the influence of liquid is a series of baffles; stiffener members fixed to an interior wall of said container; said baffles being movably attached to said containers; and spring means associated with said baffles and stiffeners whereby said baffles are elastically associated with said container and liquid.

13. Apparatus for damping the movement of a liquid in a container or the like as in claim 3 wherein said baffle means capable of moving under the influence of liquid is a series of unattached spaced baffles; and stops positioned between said baffles for spacing and limiting the degree of movement of said baffles.

14. Apparatus for damping the movement of a liquid in a container or the like as in claim 13 wherein said baffles are generally flat, washer-like members conforming in shape to a cross section of the container and lying adjacent the interior wall thereof, said stops being fixed to the interior wall of said container.

15. Apparatus for damping the movement of a liquid in a container or the like as in claim 13 wherein said stops are continuous members fixed to an interior wall of said container; said stops also operating as wall stiffeners for said container.

References Cited

UNITED STATES PATENTS

| | | | |
|---|---|---|---|
| 1,062,847 | 5/1913 | Park | 137—582 |
| 1,015,443 | 1/1912 | Hoffmann | 137—582 |
| 2,920,648 | 1/1960 | Sheffer | 137—582 |
| 2,992,656 | 7/1961 | Elliott | 137—592 |
| 3,110,318 | 11/1963 | Eultiz | 137—582 |

M. CARY NELSON, Primary Examiner

W. R. CLINE, Assistant Examiner